Figure 1:
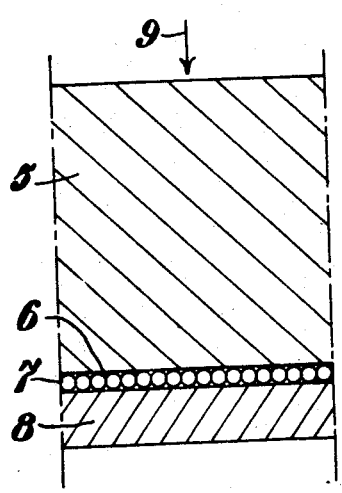

Sept. 10, 1940.  R. KILLICK  2,214,531

COLOR PHOTOGRAPHY

Filed Sept. 3, 1938

Inventor
REGINALD KILLICK
by
Attorney

Patented Sept. 10, 1940

2,214,531

UNITED STATES PATENT OFFICE 2,214,531

COLOR PHOTOGRAPHY

Reginald Killick, Chertsey, England, assignor of one-half to Charles Oak Crisp, London, England Application September 3, 1938, Serial No. 228,435
In Great Britain September 3, 1937

1 Claim. (Cl. 95—2)

This invention relates to color photography and has for its object to provide means by which sensitized films, plates, papers or other surfaces (hereafter termed films, plates or the like) may be manufactured to receive light impressions modified by color to constitute negatives, such films, plates or the like also if required being utilised to produce corresponding color-modified positives.

In general, according to the invention, colored glass, preferably pot glass, is reduced to extremely fine particles and such particles of desired and various colors are intimately mixed in required proportions and such mixture of colored glass particles is utilised in the structure of the celluloid or other film, glass or other plate or the like, to form a coating for a surface thereof or form a layer in the section thereof, such coating or layer insofar as the glass particles are concerned being one particle thick.

The film, plate or the like thus formed has on a suitable surface a panchromatic emulsion susceptible to subsequent chemical treatment so that the light impression received thereon, modified by passing through the coating or layer of multiple colored glass particles, when developed and viewed through the film, plate or the like, constitutes an image in the complementary colors.

This may be suitably treated in any desired manner, for example in a reversing bath or may be utilised for the formation of a dia-positive or for positives as required, the latter being formed from films, plates or otherwise made according to the invention.

The mixture of colored glass particles forming the coating to one surface of the film or plate, or the layer included between two other thicknesses to constitute a film or plate, preferably is carried by a suitable gelatine, although other suitable material or materials may be used.

In order that the invention may be better understood, it will now be described with reference to the accompanying drawing, in which:

Figs. 1, 2, 3 and 4 show fragmentary sections (highly magnified) of portions of films, plates or the like made according to the invention.

In preferred methods of carrying the invention into effect, the colored glasses to be brought to a finely divided condition (for example 10,000,000 to the square inch), have the following colors: blue-violet, red and green. These, when in the finely divided condition, are mixed in the proportions of two blue-violet, three red and four green.

It will be realised, however, that other colors may be used and other proportions, as well as other sizes.

The sensitised coating on the film, plate or the like should be so disposed and the said film, plate or the like so used that the light first passes through the thickness or coating of mixed glass particles before reaching the said sensitised coating.

In practical methods of carrying the invention into effect, it is preferred to use gelatine as the carrier for the glass particles. Such gelatine may be as desired, for example Nelson's Photographic No. 1, shredded or in sheets. This, when suitably prepared, is coated on to the film, plates or otherwise and while of a suitable consistency, that is to say having the required tackiness, has the mixture of glass particles disposed thereon, for example by blowing at regulated and adjustable pressure, by gravity, or otherwise. This coating operation of the glass particles may take place during the controlled passage of the film, plates or the like through a suitable apparatus. The thickness of the gelatine preferably is such that it permits the required penetration of one particle thickness, any excess being removed by shaking, blowing, suction effect, gravity or otherwise. Where required, suitable hardening means may be employed in connection with the gelatine, such for example as chrome alum, the hardening, however, not taking place until after the coating with the glass particles. Further, hardening may be caused or assisted by exposure to light. Additionally, especially where the coated surface comes on the exterior and does not form a layer between two thicknesses of glass, film or otherwise, it could be varnished or otherwise suitably treated to insulate it against chemical action or otherwise.

In the method of carrying the invention into effect as indicated in Fig. 1, 5 represents the film, glass or the like which has a gelatine or other suitable coating 6 carrying the vari-colored glass particles 7 as a unitary layer. 8 is the coating of panchromatic emulsion.

It will be realised in use that the light passes through the film, glass or the like in the direction of the arrow 9 so that the image produced in the emulsion 8 is modified by passing through the vari-colored glass-particle layer 7.

Figure 2:
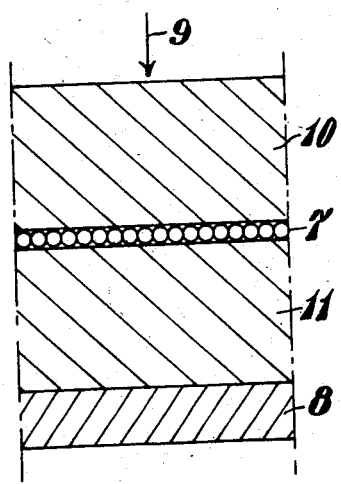

In Fig. 2 the layer of particles 7 is included between two film or glass layers 10 and 11, the panchromatic emulsion 8 being located on the layer 11 remote from the light entry 9.

Figure 3:
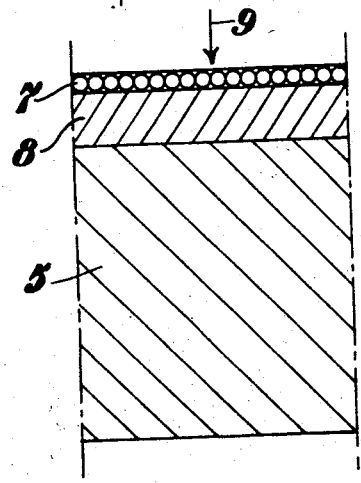

In Fig. 3 the unitary layer 7 is superposed on the panchromatic coating 8 carried by the film or the like 5, the light entry 9 being indicated in the figure.

Figure 4:
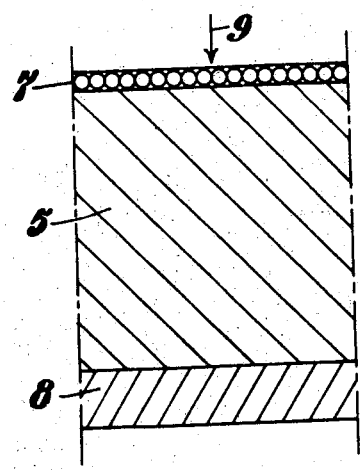

Again, in Fig. 4 the unitary layer 7 comes on one surface of the film 5 which receives the light entry 9, the other surface carrying the panchromatic emulsion coating 8.

The panchromatic emulsion (preferably pinachrome or pinacyanol dyed) preferably is applied, where possible, to the film, plates or the like after the application of the glass particle thickness or layer thereto.

In some cases, to fill any possible gaps that may have been left not covered by a one-particle thickness of the glass particles, the gelatine or other carrier therefor is dyed with a monochrome dye similar to one of the colors of the glass used. In this way the gelatine coming in said gaps can take this dye of one color and the gelatine in the other positions where it carries the glass particles, being filled by such particles, will not become dyed.

The invention is not limited to the precise forms or details of construction described, as these may be varied to suit particular cases.

What I claim and desire to secure by Letters Patent of the United States of America is:

A light-sensitised film, plate or the like comprising a transparent base, a layer thereon of differently colored fine particles of pot glass, the particles being sufficiently fine to permit of at least ten million particles being accommodated in a layer one particle thick and having an area of one square inch, and the mixture of particles consists of two parts blue-violet, three parts red and four parts green, the layer of particles having a coating of panchromatic emulsion.

REGINALD KILLICK.